(12) United States Patent
Yamada et al.

(10) Patent No.: US 6,579,473 B1
(45) Date of Patent: Jun. 17, 2003

(54) ETHYLENE PROPYLENE RUBBER FOAM AND IMAGE FORMATION EQUIPMENT

(75) Inventors: Chikara Yamada, Kanagawa-ken (JP); Toshiyuki Osaki, Tokyo (JP); Tadashi Nakajima, Tokyo (JP); Takahiro Kawagoe, Saitama-ken (JP)

(73) Assignee: Bridgestone Corporation, Tokyo (JP)

( * ) Notice: Subject to any disclaimer, the term of this patent is extended or adjusted under 35 U.S.C. 154(b) by 233 days.

(21) Appl. No.: 09/691,072

(22) Filed: Oct. 19, 2000

(30) Foreign Application Priority Data

Oct. 28, 1999 (JP) ............................................. 11-306230
Oct. 28, 1999 (JP) ............................................. 11-306231

(51) Int. Cl.⁷ ..................... G03G 13/05; G03G 15/18; C08L 23/00; C08L 23/16; H01B 1/00
(52) U.S. Cl. ..................... 252/511; 252/500; 252/502; 399/302; 399/308; 399/297; 399/168; 399/176; 492/53; 492/56; 430/126; 361/225; 361/222; 525/240; 525/243; 525/210; 521/50; 521/140
(58) Field of Search ................... 521/50, 140; 525/240, 525/243; 252/502, 511; 361/225; 399/168, 302, 308, 297, 176; 430/126; 492/53, 56

(56) References Cited

U.S. PATENT DOCUMENTS

| 5,209,872 A | * | 5/1993 | Takahashi et al. ........... 252/511 |
| 5,602,712 A | * | 2/1997 | Daifuku et al. ............. 361/222 |
| 5,922,811 A | * | 7/1999 | Suzuki et al. ............... 525/240 |
| 5,973,017 A | * | 10/1999 | Okita et al. ................. 521/134 |
| 5,978,639 A | * | 11/1999 | Masuda et al. ............. 399/302 |
| 6,040,351 A | * | 3/2000 | Okita et al. ................. 521/140 |

FOREIGN PATENT DOCUMENTS

| JP | 05059206 | * | 3/1993 | ............. C08J/9/06 |

* cited by examiner

*Primary Examiner*—Mark Kopec
*Assistant Examiner*—Kallambella Vijayakumar
(74) *Attorney, Agent, or Firm*—Oblon, Spivak, McClelland, Maier & Neustadt, P.C.

(57) ABSTRACT

An ethylene propylene rubber foam which comprises as the crude rubber, an ethylene propylene rubber having an iodine value of 35 to 45 and a Mooney viscosity $ML_{1+4}$ at 100° C. of 20 to 50, and which has less compression set and is suitable as a material for a transfer member, a primary transfer member, a secondary transfer member, a cleaning member for image formation bodies, a bias member, a backup member, etc.; an electroconductive ethylene propylene rubber foam which comprises as the crude rubber, an ethylene propylene rubber having an iodine value of 35 to 45 and a Mooney viscosity $ML_{1+4}$ at 100° C. of 20 to 50, and which electrifies an image formation body through direct charge injection by applying voltage, thus enabling to electrify at low voltage, substantially prevent ozone generation, noises and defective image; an electrifying member comprising the above electroconductive rubber foam; electrifying equipment equipped with the above member; and image formation equipment equipped with the above member or the above equipment.

11 Claims, No Drawings

ETHYLENE PROPYLENE RUBBER FOAM AND IMAGE FORMATION EQUIPMENT

BACKGROUND OF THE INVENTION

1. Field of the Invention

The present invention relates to an ethylene propylene rubber foam which is improved in its compression set. More particularly, the present invention pertains to an ethylene propylene rubber foam well suited for use as a material which forms a member to be installed in electrophotographic equipment and electrostatic recording equipment such as a copying machine, facsimile equipment and a printer; to a member such as a transfer member composed of this rubber foam; and image formation equipment (I) equipped with the above-mentioned member.

The present invention is of such a system that directly injects electrical charge by applying voltage so as to electrify an image formation body. Thus the present invention further relates to an electrifying member which comprises an electroconductive ethylene propylene rubber foam and which is capable of suppressing the generation of a defective image; and electrifying equipment and image formation equipment (II) each equipped with the above mentioned electrifying member.

2. Description of the Related Arts

In electrostatic recording equipment and electrophotographic system such as a copying machine, facsimile equipment and a printer, there have heretofore been employed a variety of members such as a transfer roller, a bias roller, a backup roller, a toner feeding roller, a cleaning roller and a paper feeding roller in addition to an electrifying roller used for the purpose of electrifying an image formation member. As the material for forming the above-mentioned member, an ethylene propylene rubber foam is used in the majority of cases.

The major reasons for the frequent use of the ethylene propylene rubber foam are that said rubber foam is stable against ozone, $NO_x$, heat and the like, and has favorable durability.

However, because of its large compression set, the ethylene propylene rubber foam is involved in such a problem that the rubber foam sometimes causes defective image due to deformation when a member composed of an ethylene propylene rubber foam is brought into contact with an other member for a long period of time.

Under such circumstances, an attempt is made to improve the compression set of an ethylene propylene rubber foam through a method in which the content of the rubber component is increased by decreasing the contents of a filler and/or a process oil in a crude rubber composition. An increase in the content of the rubber component, however, brings about such problems that molding processability of the rubber composition is worsened and at the same time, foaming cells are made coarse.

On the one hand, in electrophotographic equipment and electrostatic recording equipment such as a printer and a copying machine, electrifying equipment of corona discharge system has heretofore been employed as electrifying equipment for electrifying an object of electrification such as an electrophotographic photoreceptor and electrostatic recording body. However, the aforesaid corona discharge system unfavorably requires a high voltage in the range of 5 to 10 kV, and besides is involved in an environmental problem due to the generation of a large amount of ozone in the course of corona discharge.

In such circumstances, a contact electrification system has recently been put into extensive practice wherein an electrifying member to which voltage is applied is brought into contact with an object of electrification such as a photoreceptor so as to electrify the aforesaid object. The above-mentioned electrification system is advantageous in that the applied voltage can be lowered and besides, the ozone generation can be decreased as compared with the corona discharge system. Nevertheless, the conventional contact electrification system, which majorly utilizes atmospheric discharge that is carried out through a slight clearance between an electrifying member and an image formation body, has not necessarily been satisfactory, since it is incapable of sufficiently preventing the ozone generation.

In addition, the application of direct current voltage only by bringing an electrifying member into contact with an object of electrification gives rise to the difficulty in uniformly electrifying the object of electrification, thereby causing a fear of uneven electrification. It is a general practice as a countermeasure thereagainst to superimpose alternate current and direct current, whereby serious problem is brought about in that vibration occurs between the object of electrification and the electrifying member, inevitably causing unfavorable noise.

Such being the case, the present inventors proposed the electrification system in which a charge is directly injected from an electrifying member to an object of electrification without being accompanied with atmospheric discharge {refer to Japanese Patent Application Laid-Open No.210283/1993 (Heisei-5)}. In the above proposed system, electrification is carried out by means of direct charge injection by bringing an electrifying member into contact with an object of electrification so as to apply direct current voltage basically without being accompanied by atmospheric discharge through appropriate adjustment between the applied voltage and the electrostatic capacities of the electrifying member and the object of electrification. Thus, said system possesses such advantages that the system enables electrification at a low voltage, since the voltage for the start of discharge needed for atmospheric discharge is dispensed with, that the system is substantially free from ozone generation, and that the system is substantially free from the problem of noise generation caused by application of alternate current voltage.

As mentioned hereinbefore, the direct charge injection system is a favorable system in principle, but is involved in various problems to be solved in order that it is brought to practical use. That is to say, unless the object of electrification is brought into close contact with the electrifying member, part of the object of electrification which is non-electrified tends to remain. When an image is formed in such a state, there are sometimes caused in part such defects as fog, black points, white points, white streaks, black streaks and unevenness. When the pushing pressure is enhanced in order to bring the electrifying member into close contact with the object of electrification, part of the aforesaid object is scraped off, thereby causing the problem of defective image. As a countermeasure thereagainst it is proposed to constitute the electrifying member of an elastic foam, but as a matter of fact, the above-mentioned defect and trouble are not yet prevented at the present time.

SUMMARY OF THE INVENTION

The present invention was made in the light of the above-mentioned circumstances. Thus a general object thereof is to provide an ethylene propylene rubber foam which has improved compression set and stabilized microcells; a member which comprises the aforesaid ethylene propylene rubber foam, and which is used for a variety of image formation equipment; and image formation equipment (I) equipped with the aforesaid member.

Moreover, the present invention is of such a system that electrifies an image formation body through direct injection of electrical charge by applying voltage thereto. Thus another object thereof is to provide an electrifying member which comprises an electroconductive ethylene propylene rubber foam and which is capable of suppressing the generation of a defective image; and electrifying equipment and image formation equipment (II) each equipped with the above mentioned electrifying member.

Other objects of the present invention will be obvious from the text of this specification hereinafter disclosed.

In such circumstances, intensive research and investigation were carried out by the present inventors in order to achieve the above-mentioned objects. As a result, it has been found that it is made possible to obtain an ethylene propylene rubber foam which has improved compression set and stabilized microcell foam by using as crude rubber, an ethylene propylene rubber having a iodine value in the range of 35 to 45 and a Mooney viscosity $ML_{1+4}$ at 100° C. in the range of 20 to 50. It has also been found that a favorable image is obtainable and the objects of the invention can be achieved by the use of an electrifying member which is composed of an ethylene propylene rubber foam having a iodine value and Mooney viscosity $ML_{1+4}$ at 100° C. each in a specific range, so that appropriate contact is attained between the electrifying member and an image formation body, and uniform electrification is made possible. The present invention has been accomplished by the foregoing findings and information.

That is to say, the present invention provides an ethylene propylene rubber foam which comprises as the crude rubber, an ethylene propylene rubber having an iodine value in the range of 35 to 45 and a Mooney viscosity $ML_{1+4}$ at 100° C. in the range of 20 to 50; at least one member selected from the group consisting a transfer member, a primary transfer member, a secondary transfer member, a toner feeding member, a cleaning member for an image formation body, a bias member, a backup member, an electrifying member, a developing member and a paper feeding member each being composed of the above-mentioned ethylene propylene rubber foam; and image formation equipment equipped with at least one of the aforesaid members.

In addition, the present invention provides an electrifying member which electrifies an image formation body through direct charge injection by bringing said member into contact with the image formation body, and applying voltage therebetween, and which comprises an electroconductive ethylene propylene rubber foam, said rubber foam comprising as the crude rubber, an ethylene propylene rubber having an iodine value in the range of 35 to 45 and a Mooney viscosity $ML_{1+4}$ at 100° C. in the range of 20 to 50; electrifying equipment comprising said electrifying member used therefor; and image formation equipment equipped with said electrifying equipment.

DESCRIPTION OF PREFERRED EMBODIMENT

In the ethylene propylene rubber foam according to the present invention, there is used as a crude rubber, an ethylene propylene rubber having an iodine value in the range of 35 to 45 and a Mooney viscosity $ML_{1+4}$ at 100° C. in the range of 20 to 50. Preferably, the above-mentioned rubber has an iodine value in the range of 35 to 40 and a Mooney viscosity $ML_{1+4}$ at 100° C. in the range of 30 to 45. The iodine value, when being less than 35, leads to unfavorably high compression set of 20 to 40%, whereas the iodine value, when being more than 45, unfavorably gives rise to deteriorated resistance of the ethylene propylene rubber foam against ozone and the like. The Mooney viscosity $ML_{1+4}$ at 100° C., when being less than 20, brings about such disadvantage that the viscosity of an unvulcanized rubber composition becomes unreasonably low, thus causing excessive foaming, whereby the resultant cells are made coarse, whereas the Mooney viscosity $ML_{1+4}$ at 100° C., when being more than 50, brings about such disadvantage that the viscosity of an unvulcanized rubber composition becomes unreasonably high, thus causing insufficient foaming, whereby the density of the resultant foam is made too high.

The ethylene propylene rubber foam according to the present invention may be blended with other components that are to be optionally and properly selected, provided that use is made of the above-mentioned ethylene propylene rubber.

Preferably, the aforesaid crude rubber in an amount of 100 parts by weight is blended with 0.5 to 5 parts by weight of (A) a vulcanizing agent, 1 to 15 parts by weight of (B) a foaming agent, 10 to 80 parts by weight of (C) a process oil and 10 to 60 parts by weight of (D) a filler. The objective rubber foam is obtainable by vulcanizing and foaming the blend thus formed. In the case where the ethylene propylene rubber foam according to the present invention is made electroconductive, 1 to 80 parts by weight of an electroconductive material (E) may be blended, followed by vulcanizing and foaming.

The vulcanizing agent to be used as the component (A) may be selected for use from a variety of vulcanizing agents, but is preferably of sulfur base from the viewpoint of its capability of facilitating foaming and vulcanization of the ethylene propylene rubber composition. By the term "sulfur base vulcanizing agent" as used herein is meant the combination of sulfur and a vulcanization accelerator, or a sulfur-containing organic compound. Examples of vulcanization accelerator include thiazoles, sulfenamides, thiourea, thiuram, dithiocarbamates, guanidines, aldehyde amines and aldehyde ammonia. Any of the exemplified vulcanization accelerator may be used alone or in the form of mixture with at least one other. Examples of sulfur-containing organic compound include morpholine disulfide, tetraalkylthiuram disulfide and dipentamethylene thiuram tetrasulfide. The amount of the vulcanizing agent to be added to the rubber is preferably 0.5 to 5 parts by weight based on 100 parts by weight of the ethylene propylene rubber.

Examples of foaming agents as the component (B) include organic foaming agents such as sulfonylhydrazides that are exemplified by p,p'-oxybis(benzenesulfonylhydrazide) (OBSH), benzenesulfonylhydrazide and toluenesulfonylhydrazide, azo compounds that are exemplified by azocarbonamide (ADCA) and azobisisobutylonitrile, and nitroso compounds that are exemplified by N,N'-dinitrosopentamethylenetetramine, N,N'-dimethyl-N,N'-dinitrosoterephalamide; and inorganic foaming agents such as sodium hydrogencarbonate and ammonium hydrogen-carbonate. Preferable foaming agents among them are OBSH, ADCA and a combination of them. The amount of the foaming agent to be added to the rubber is preferably 1 to 10 parts by weight, particularly preferably 3 to 8 parts by weight based on 100 parts by weight of the ethylene propylene rubber. It is preferable to minimize the particle diameter of the foaming agent in order to decrease the size of foam cells. The particle diameter thereof is preferably 10μm or smaller, particularly preferably 5 μm or smaller.

Examples of process oils as the component (C) that are usable with the rubber include paraffin base process oil, naphthene base process oil and aromatic base process oil, Of these, paraffin base process oil is preferable from the viewpoint of its property of non-contaminating an other member such as a photosensitive body. The amount of the process oil to be added to the rubber is preferably 20 to 70 parts by weight, particularly preferably 40 to 70 parts by weight based on 100 parts by weight of the ethylene propylene rubber. An amount of the process oil, when being less than 20 parts by weight, brings about unreasonably high viscosity of the resultant rubber composition thus causing poor processability, and at the same time, unreasonably high density of the foam to be produced due to insufficient foaming. On the other hand, an amount of the process oil, when being more than 70 parts by weight, brings about the disadvantage of unreasonably low viscosity of unvulcanized rubber composition thus causing coarse cell due to excessive foaming.

Examples of fillers as the component (D) that are usable with the rubber include calcium carbonate, magnesium carbonate, magnesium silicate and clay. Of these, calcium carbonate is preferable from the viewpoint of its property of stabilizing foam cell. The amount of the filler to be added to the rubber is preferably 10 to 60 parts by weight, particularly preferably 20 to 50 parts by weight based on 100 parts by weight of the ethylene propylene rubber. An amount of the filler, when being less than 10 parts by weight, results in unstabilized and non-uniform foam cell, whereas an amount of the filler, when being more than 60 parts by weight, leads to unreasonably large compression set of the ethylene propylene rubber foam.

Examples of the electroconductive material as the component (E) include electroconductive carbon black such as ketchen black and acetylene black; carbon black for rubber such as SAF, ISAF, HAF, FEF, GPF, SRF, FT and MT; carbon black for ink such as oxide carbon black, thermally cracked carbon black, graphite; electroconductive metal oxide such as tin oxide, titanium oxide and zinc oxide; metals such as nickel and copper; and electroconductive whisker such as electroconductive potassium titanate whisker, electroconductive barium titanate whisker, electroconductive titanium oxide whisker and electroconductive zinc oxide whisker. The amount of the electroconductive material to be added to the rubber is preferably 1 to 80 parts by weight, particularly preferably 5 to 60 parts by weight based on 100 parts by weight of the ethylene propylene rubber. By adding the above-mentioned electroconductive material to the rubber, it is made possible to adjust the specific volume resistance of the ethylene propylene rubber foam according to the present invention to the range of $10^4$ to $10^{10}$ Ω·cm.

To the ethylene propylene rubber foam according to the present invention, a rubber additive may be properly added which is exemplified by a vulcanization accelerator aid such as zinc white and stearic acid, an anti-scorching agent, a tackifier and miscellaneous rubber additives to the extent that the working effect of the present invention is not impaired by such addition.

In the following, some description will be given of a process for producing the ethylene propylene rubber foam according to the present invention, for instance, in the case of producing a roller-shaped member.

In the first place, the ethylene propylene rubber is blended and kneaded with the rubber additives other than a vulcanizing agent and a foaming agent at a temperature in the range of 110 to 180° C., approximately by the use of a kneader, a Banbury mixer or the like. The resultant kneaded mixture is allowed to cool and thereafter, a vulcanizing agent and a foaming agent are added to the mixture and kneaded at a temperature in the range of 50 to 90° C., approximately to produce a rubber composition.

Subsequently, by the use of an extruder the resultant rubber composition is extruded in the form of cylinder, and cut into a prescribed length. A dummy shaft is inserted into the cylindrical rubber composition, which is then set in a preheated mold and is heated at a prescribed temperature for a prescribed period of time (usually at 140 to 180° C. for 5 to 30 minutes, approximately) In order to obtain a foam having uniform and fine foam cells, importance should be attached to the pressure applied to the mold, which is preferably $9.8 \times 10^5$ to $9.8 \times 10^6$ Pa (10 to 100 kg/cm², approximately), particularly preferably $1.9 \times 10^6$ to $7.9 \times 10^6$ Pa (20 to 80 kg/cm², approximately). As heating method for the purpose of obtaining the foam, there are available high frequency heating method, hot blast heating method, fluidized bed heating method, vulcanizing kettle heating method and the like heating method in addition to the above-described mold heating method. Of these, mold heating method is particularly preferable from the standpoint of its capability of producing an ethylene propylene rubber foam which has uniform and fine foam cells and also has small compression set.

After the cylindrical rubber composition is heated at a prescribed temperature for a prescribed period of time, the mold is opened to obtain an ethylene propylene rubber foam. The dummy shaft is removed, and thereafter a genuine shaft which has been coated in advance with an adhesive is inserted thereinto in place of the dummy shaft thus removed, and is heated with hot blast or the like so as to carry out adhesion treatment between the ethylene propylene rubber foam and the shaft thus inserted simultaneously with post vulcanization of the resultant foam. The post vulcanization is put into practice at a temperature in the range of 140 to 200° C. for 15 to 60 minutes, approximately.

The shafted rubber foam thus obtained is adjusted to a desired outside diameter by subjecting the peripheral surface thereof to grinding with a grindstone, peeling with a blade or the like treatment so as to obtain the objective roller. It is preferable to further carry out an annealing treatment to remove internal stress remaining in the roller, since the compression set is lessened. The annealing treatment is put into practice at a temperature in the range of 70 to 200° C. for 15 to 300 minutes, approximately.

In addition to the above-mentioned production method, the member which is in the form of a roller and is composed of the ethylene propylene rubber foam can be produced by a method in which the rubber composition is injected into a mold wherein a dummy shaft is set in advance by the use of an injection molding machine in place of an extruder, followed by heating foaming.

Such being the case, it is made possible to suppress the compression set of the resultant foam to 15% or less, and at the same time to obtain ethylene propylene rubber foam which has uniform microcells, a foam density of 0.1 to 0.5 g/cm³ and the average diameter of a foam cell of 30 to 100 μm by the use of ethylene propylene rubber having an iodine value in the range of 35 to 45 and a Mooney viscosity $ML_{1+4}$ at 100° C. in the range of 20 to 50.

The ethylene propylene rubber foam according to the present invention is well suited for use as a material which constitutes a transfer member, a primary transfer member, a secondary transfer member, a toner feeding member, a cleaning member for image formation bodies, a bias member, a backup member, an electrifying member, a developing member, a paper feeding member and the like. The rubber foam can be made into the form of a roll, blade or the like. In the case of the image formation equipment (I), one or at least two of these members can be fitted thereto.

On the one hand, the electrifying member according to the present invention comprises the electroconductive ethylene propylene rubber foam. In the aforesaid electroconductive ethylene propylene rubber foam, other components to be blended therewith may be properly and optionally selected provided that use is made of the foregoing ethylene propylene rubber. Preferably, the above-mentioned electroconductive ethylene propylene rubber foam can be produced by a method in which the crude rubber in an amount of 100 parts by weight is blended with 0.5 to 5 parts by weight of a (A) vulcanizing agent, 1 to 15 parts by weight of a (B) foaming agent, 10 to 80 parts by weight of a (C) process oil, 10 to 60 parts by weight of a (D) filler and 1 to 80 parts by weight of an electroconductive material (E). The objective rubber foam is obtainable by vulcanizing and foaming the blend thus formed. The components (A), (B), (C), (D), and (E) are each the same as those herein-before described.

It is made possible to adjust the specific volume resistance of the electrifying member according to the present invention to the range of $10^4$ to $10^{10}$ Ω·cm. In order to obtain a favorable image, the specific volume resistance thereof is particularly preferably in the range of $10^5$ to $10^8$ Ω·cm. The electrifying member according to the present invention can be produced by the method same as that hereinbefore described.

Moreover, the electrifying equipment according to the present invention is constituted of the above-mentioned electrifying member and a electric power source. The image formation equipment (II) comprises the electrifying equipment installed therein, and may be equipped with one or at least two members that are exemplified in the case of the image formation equipment (I).

In the following, the present invention will be described in more detail with reference to comparative examples and working examples, which however shall never limit the present invention thereto.

In addition, measurements were made of the physical properties of the electroconductive roller obtained in each of the examples in accordance with the following procedures.
(1) Physical Properties of Rubber Foam
(a) Diameter and Number of Cells
The diameter and the number of cells of the image were measured by photography at a magnification of about 70 using a CCD camera manufactured by Hilock Co.,Ltd.
(b) Asker C Hardness
Asker C hardness was measured according to JIS K6301.
(c) Density
Density was obtained by dividing the weight of rubber foam in the air by the volume thereof.
(d) Compression Set
Compression set was measured according to JIS K6382 (foam rubber for cushion).
(e) Specific Volume Resistance
Specific volume resistance ρ was calculated from the following formula using the resistance of the electroconductive roller as expressed below $$R = (\rho r_2 / Ld) \ln(r_2/r_1)$$

where,
R: resistance of the electroconductive roller
ρ: specific volume resistance of rubber foam
L: contact length in axial direction
d: nip width
$r_1$: shaft radius
$r_2$: outside radius of electroconductive roller
ln: natural logarithm
(2) Resistance of Electroconductive Roller
The resistance of the electroconductive roller was measured by applying a load of 500 g onto each of the ends of an electroconductive roller as a specimen so that it was pressed to a copper plate, while applying 100V voltage thereto and using a specific resistance meter R 8340A manufactured by Advantest Corporation.

EXAMPLE 1

Ethylene propylene rubber (EPDM) having an iodine value of 36 and a Mooney viscosity $ML_{1+4}$ at 100° C. of 39 in an amount of 100 parts by weight was blended with blending components the types and amounts of which are given in Table 1 by the use of a kneader, so that unvulcanized rubber foam composition was prepared. By using an extruder, the composition thus prepared was molded into a tubular body having an inside diameter of 4 mm, an outside diameter of 20 mm and a length of 240 mm. Then the tubular body, into which a stainless steel-made dummy shaft having a diameter of 4 mm and a length of 300 mm was inserted, was subjected to vulcanization and foaming at 170° C. for 15 minutes in a cylindrical mold. The tubular foam thus obtained was placed in an air oven, and further vulcanized at 180° C. for one hour.

The dummy shaft was removed from the vulcanized tubular foam. Subsequently the tubular foam, into which a metallic shaft with an outside diameter of 6 mm wound with a hot melt adhesive was inserted by pressing, was subjected to a thermal adhesion treatment at 120° C. for 70 minutes, allowed to cool, and polished on the surface, so that an electroconductive roller having an outside diameter of 12 mm and a length of 220 mm was obtained. The physical properties of the resultant electroconductive roller are given in Table 1.

Comparative Example 1

The procedure in Example 1 was repeated to prepare an electroconductive roller having an outside diameter of 12 mm and a length of 220 mm except that use was made of EPDM having an iodine value of 26 instead of 36 and a Mooney viscosity $ML_{1+4}$ at 100° C. of 45 instead of 39. The physical properties of the electroconductive roller thus obtained are also given in Table 1.

Comparative Example 2

The procedure in Example 1 was repeated to prepare an electroconductive roller having an outside diameter of 12 mm and a length of 220 mm except that use was made of EPDM having an iodine value of 26 instead of 36 and a Mooney viscosity $ML_{1+4}$ at 100° C. of 100 instead of 39. The physical properties of the electroconductive roller thus obtained are also given in Table 1.

TABLE 1

|  | Example 1 | Comparative Example 1 | Comparative Example 2 |
|---|---|---|---|
| COMPOSITION OF FOAM-CONSTITUTING MATERIAL (PARTS BY WEIGHT) | | | |
| EPDM 1[(1)] | 100 | — | — |
| EPDM 2[(2)] | — | 100 | — |
| EPDM 3[(3)] | — | — | 100 |
| Carbon black[(4)] | 56 | 56 | 56 |
| Calcium carbonate[(5)] | 30 | 30 | 30 |
| Process oil[(6)] | 60 | 60 | 60 |
| Zinc white | 3 | 3 | 3 |
| Stearic acid | 2 | 2 | 2 |
| Vulcanization accelerator[(7)] | 1 | 1 | 1 |
| Sulfur | 1.5 | 1.5 | 1.5 |
| Foaming agent OBSH[(8)] | 6 | 6 | 6 |
| PHYSICAL PROPERTIES | | | |
| Electroconductive foam | | | |
| Average cell diameter (μm) | 30 | 120 | 30 |
| Average number of cells (per 25 mm) | 900 | 200 | 900 |
| Asker C hardness(°) | 35 | 33 | 45 |
| Density (g/cm$^3$) | 0.31 | 0.28 | 0.41 |
| Compression set (%) | 6 | 18 | 16 |
| Specific volume resistance (Ω·cm) | $3 \times 10^5$ | $5 \times 10^5$ | $8 \times 10^6$ |
| Roller resistance (Ω) | $3 \times 10^4$ | $2 \times 10^4$ | $2 \times 10^6$ |

{Remarks}
[(1)]EPDM having an iodine value of 36 and a Mooney viscosity $ML_{1+4}$ at 100° C. of 39
[(2)]EPDM having an iodine value of 26 and a Mooney viscosity $ML_{1+4}$ at 100° C. of 45
[(3)]EPDM having an iodine value of 26 and a Mooney viscosity $ML_{1+4}$ at 100° C. of 100
[(4)]Manufactured by Tokai Carbon Co., Ltd. under the trade name "TB#5500"
[(5)]Manufactured by Nitto Funka Kogyo Co., Ltd. under the trade name "Novelite A"
[(6)]Manufacturd by Idemitsu Kosan Co., Ltd. under the trade name "Diana Process Oil PW 900"
[(7)]2-mercaptobenzothiazole
[(8)]Manufactured by Eiwa Chemical Industries Co., Ltd. under the trade name "Neoselbon N#5000" {p,p'-oxybis(benzenesulfonylhydrazide)}

What is claimed is:

1. A member which is selected from the group consisting of a transfer member, a primary transfer member, a secondary transfer member, a toner feeding member, a cleaning member for image formation bodies, a bias member, a backup member, an electrifying member, a developing member and a paper feeding member, and which comprises an ethylene propylene rubber foam which comprises as crude rubber, an ethylene propylene rubber having an iodine value in the range of 35 to 45 and a Mooney viscosity $ML_{1+4}$ at 100° C. in the range of 20 to 50.

2. An image formation equipment which is equipped with one or at least two of the members as set forth in claim 1.

3. An electrifying member which electrifies an image formation body through direct charge injection by bringing said member into contact with said body, and applying voltage therebetween, and which comprises an electroconductive ethylene propylene rubber foam, said rubber foam comprising as the crude rubber, an ethylene propylene rubber having an iodine value in the range of 35 to 45 and a Mooney viscosity $ML_{1+4}$ at 100° C. in the range of 20 to 50.

4. The electrifying member according to claim 3, wherein the electroconductive ethylene propylene rubber foam has a compression set of at most 15%.

5. The electrifying member according to claim 3, wherein the electroconductive ethylene propylene rubber foam has a density in the range of 0.1 to 0.5 g/cm$^3$.

6. The electrifying member according to claim 3, wherein the electroconductive ethylene propylene rubber foam has foam cells having an average diameter in the range of 30 to 100 μm.

7. The electrifying member according to claim 3, wherein the electroconductive ethylene propylene rubber foam is composed of a rubber composition which comprises 100 parts by weight of the ethylene propylene rubber as set forth in claim 3, 0.5 to 5 parts by weight of a (A) vulcanizing agent, 1 to 15 parts by weight of a (B) foaming agent, 10 to 80 parts by weight of a (C) process oil, 10 to 60 parts by weight of a (D) filer and 1 to 80 parts by weight of a (E) electroconductive material.

8. The electrifying member according to claim 7, wherein the foaming agent has a particle diameter of at most 10 μm.

9. The electrifying member according to claim 7, wherein the electroconductive ethylene propylene rubber foam has specific volume resistance in the range of $10^4$ to $10^{10}$ Ω·cm.

10. Electrifying equipment equipped with the electrifying member as set forth in claim 3 which electrifies an image formation body through direct charge injection by bringing said member into contact with said body, and applying voltage therebetween.

11. Image formation equipment which is equipped with the electrifying equipment as set forth in claim 10.

* * * * *